UNITED STATES PATENT OFFICE

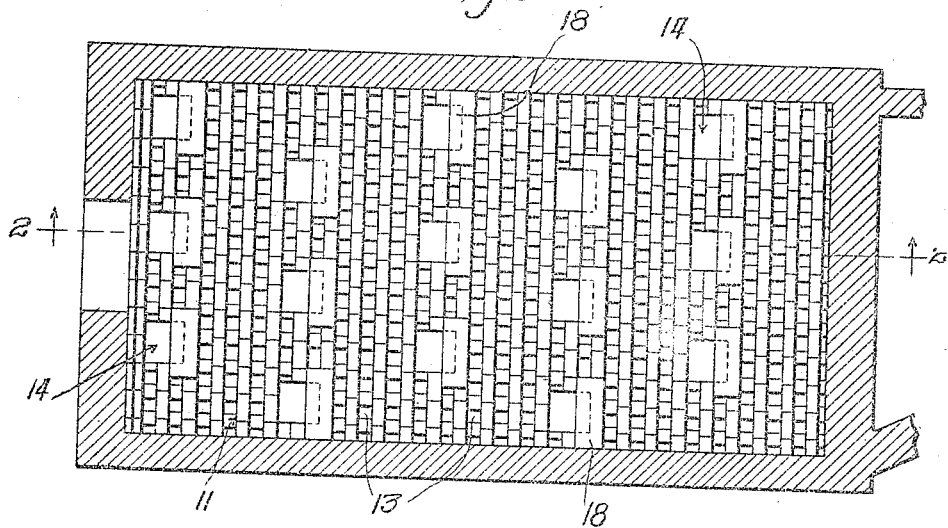
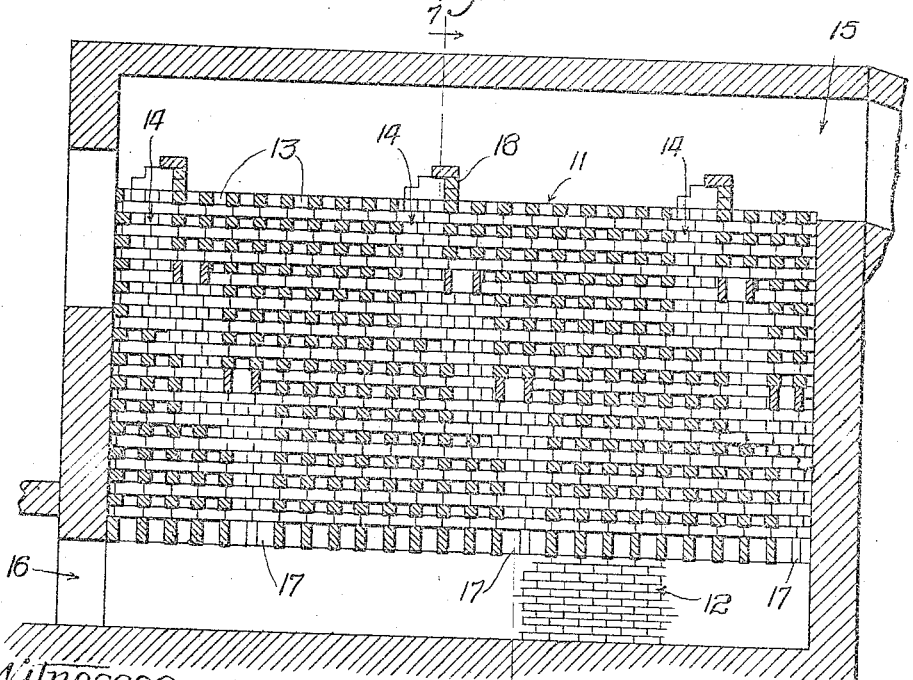

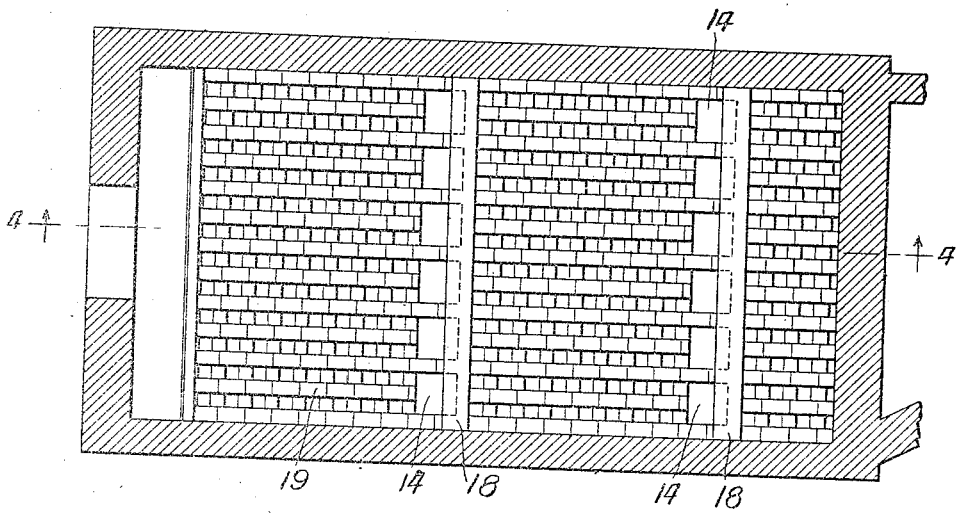
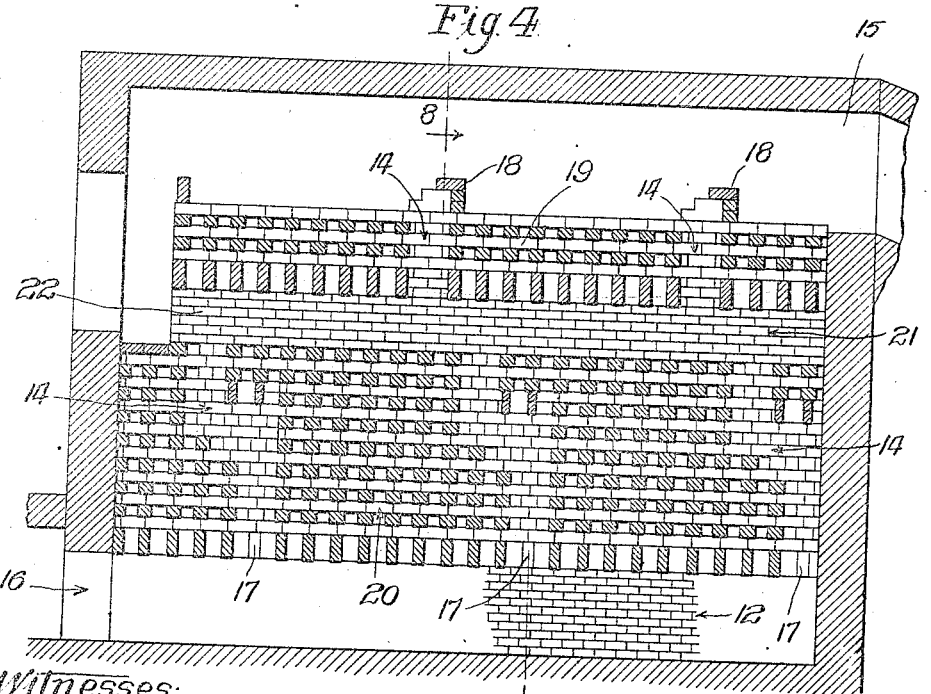

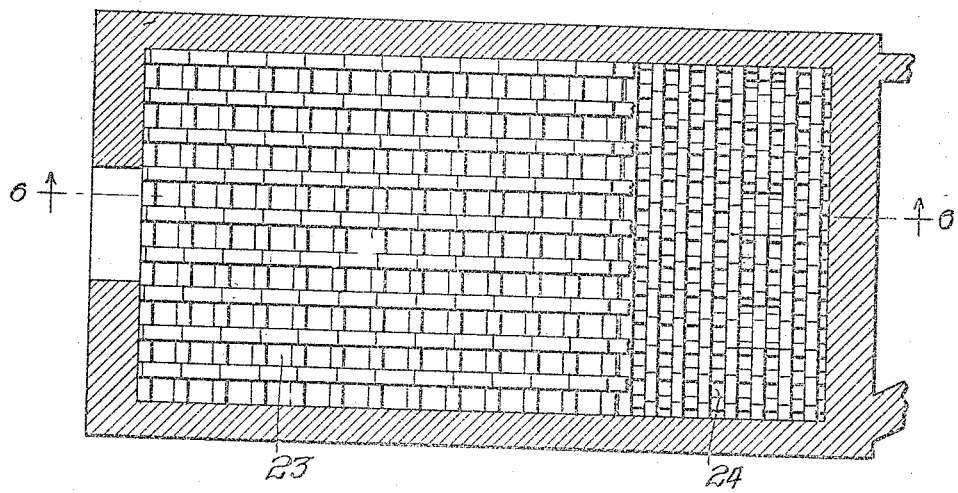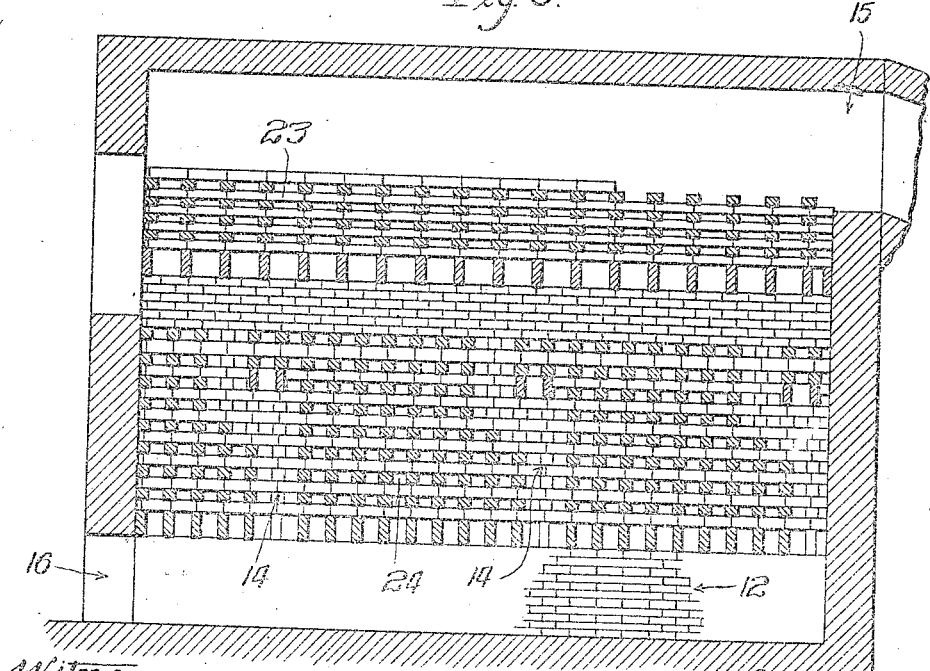

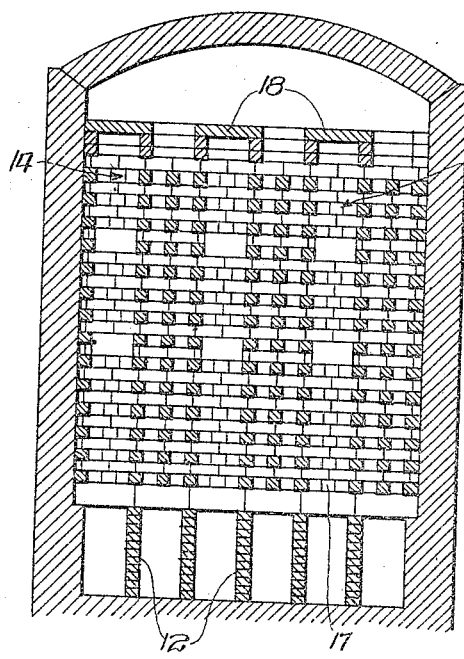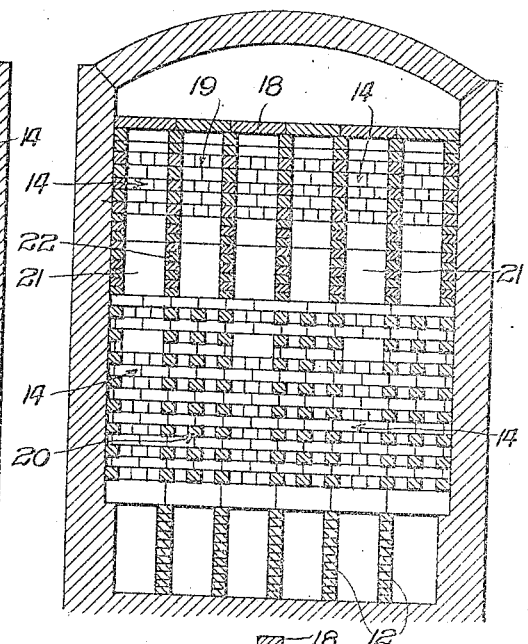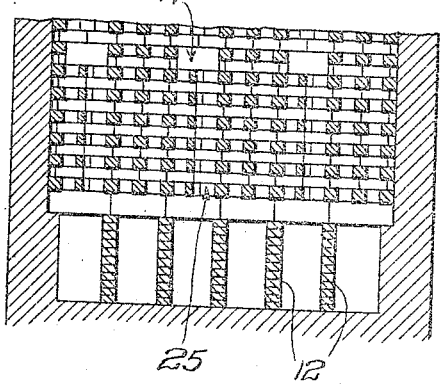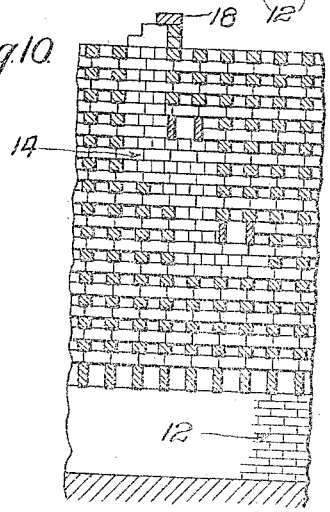

FRANK ORTH, OF INDIANA HARBOR, INDIANA.

REGENERATOR FOR FURNACES.

1,165,340. Specification of Letters Patent. Patented Dec. 21, 1915.

Application filed May 27, 1914. Serial No. 841,216.

*To all whom it may concern:*

Be it known that I, FRANK ORTH, a citizen of the United States, residing at Indiana Harbor, in the county of Lake and State of Indiana, have invented certain new and useful Improvements in Regenerators for Furnaces, of which the following is a specification.

The present invention has reference to certain improvements in furnace regenerators, and has particular reference to improvements which are intended to improve the operation of the regenerator notwithstanding the presence of flue dust and the like in the flue gases.

It has been found by experience that there is a tendency for the upper courses or sections of the regenerator to become clogged or closed by the flue dust very much more rapidly than is the case with the lower courses or portions. This tendency seems to result primarily from two causes. In the first place as the gases are delivered over from the furnace they strike the upper courses at their highest temperature and reach the lower course at a comparatively lower temperature after having been "stunned" or "chilled". The result is that the upper courses of checker-work will fuse or soften to a certain extent so that the flue dust will readily adhere or stick to these portions. In the second place the gases contain or carry more suspended matter when they first enter the regenerator than after they have traveled through or traversed a portion of the checker-work. Furthermore, the total cross-sectional area of the checker openings is very much less than the area of the space above them so that the velocity of the gases must suddenly increase as they enter the checker-work. This sudden increase of velocity causes violent agitation or eddying and tends to still further precipitate the suspended matter onto the checker work of the top courses. This tendency for the flue dust to collect principally on the upper courses of the checker-work results in a comparatively rapid clogging or closing of the passages therein. The result is that it is generally necessary to shut down or close down the furnace and regenerators for the purpose of replacing or removing the upper courses of the checker work long before the lower courses have become materially damaged or disabled. Each time such repairs are necessary there is a considerable waste of time in the operation of the furnace and also the labor expense is large.

One object of the present invention is to so arrange or construct the body of the checker-work that a portion of the gases will be delivered directly into the body of the checker-work without having to pass through or traverse the upper courses, so that the access of the gases to the body of the checker-work and the lower portion thereof will not be dependent upon the ability of the gases to pass through the checker openings of the upper courses. At the same time the suspended matter will be more evenly distributed throughout the entire body of the checker-work so that a very much greater period of time, or a very much longer campaign of operation will elapse before it becomes necessary to renew or replace any portion of the checker-work. At the same time even after some portions of the checker-work may have become so clogged or loaded that the gases cannot easily pass through them, the gases will pass down through the supplementary or enlarged passage-ways which are disclosed in the present application, so that the operation of the regenerator may be successfully continued long after a time when the ordinary regenerator would have been so clogged that it could no longer be successfully used.

Another object of the invention is to associate or combine the advantages above mentioned with certain of the benefits or advantages which follow from the constructions disclosed in my co-pending application, Serial No. 756,167, which was filed March 22, 1913. This association or combination relates particularly to the association or combination of a heat storage reservoir comprising primary and secondary heat storage sections in combination with the further provision of supplementary passage-ways or enlarged openings to facilitate the ready access of the gases to the interior or body portions of the checker-work. It will be understood, however, that the disclosures of the present application are in no wise limited to use in combination or association with those of the above mentioned application.

Other objects and uses will appear from a detailed description of the invention which consists in the features of construction and combinations of parts hereinafter described and claimed.

In the drawings: Figure 1 shows a plan view looking down on the body of a regenerator embodying certain of the features of the present invention as embodied in one form of construction; Fig. 2 is a longitudinal vertical section taken on the line 2—2 of Fig. 1 looking in the direction of the arrows; Fig. 3 is a plan view of another form of construction which embodies the features of the present invention, and which also embodies the principle of primary and secondary heat storage sections; Fig. 4 is a vertical longitudinal section taken on the line 4—4 of Fig. 3 looking in the direction of the arrows; Fig. 5 is a plan view of still another form of construction in which the checkers of the primary heat storage section are spaced differently from the checkers of the secondary section; Fig. 6 is a vertical longitudinal section taken on the line 6—6 of Fig. 5 looking in the direction of the arrows; Fig. 7 is a vertical cross section taken on the broken line 7—7 of Fig. 2 looking in the direction of the arrows; Fig. 8 is a vertical cross section taken on the broken line 8—8 of Fig. 4 looking in the direction of the arrows; Fig. 9 shows a modified arrangement of the lower portion of the construction shown in Fig. 7; and Fig. 10 shows a modified form of the construction shown in Fig. 2, the modification consisting in terminating the enlarged passages at a point somewhat above the lower portion of the checker-work.

One feature of the present invention has to do with the provision of passage-ways or openings through certain portions of the heat absorbing structure of greater size or cross section than those through the remainder of the structure, the enlarged openings or passage-ways being formed in those portions of the structure where there will probably be the greatest tendency for the openings to become clogged or obstructed by the flue dust. Ordinarily these openings of larger area would be formed in the upper portion of the structure, or in that portion which is first encountered by the gas as it enters the regenerator.

Referring to the construction shown in Figs. 1 and 2 in this case the body of the heat absorbing structure constitutes the checker-work 11. It may be supported in the usual manner by means of the longitudinally extending rider walls 12. The size of the openings in the main body of the checker-work is shown at 13 in Fig. 1. As has been previously explained, these openings are of such a size that the checker-work at the upper portion of the structure will ordinarily become clogged up long before that in the body of the checker-work. I therefore provide enlarged openings extending down into the body of the checker so as to facilitate the entrance of the flue gases into the same. In the arrangement shown in Figs. 1 and 2 the enlarged openings are the passage-ways 14. As is clearly illustrated in Fig. 1, they are conveniently staggered with respect to each other as to secure a more uniform distribution of them throughout the body of the regenerator. The incoming flue gases enter at the point 15 and are delivered from the point 16. It therefore follows that their general direction is forwardly and downwardly, or in a diagonal direction with respect to the checker-work. If the passages 14 extend straight down into the body of the checker-work or if they are allowed to slant in the same general direction as the flow of the gases there may be a tendency for the gases to pass through the openings without being diverted or forced into the body of the checker-work as much as would be desired. In order to counteract or offset any such tendency I prefer to slant or bend the passages 14 in such a direction as to bring them substantially at right angles to the general direction of movement of the gases. This sort of an arrangement is well illustrated in Fig. 2 in which the upper ends of the passages are set considerably forward of their lower ends 17. With this arrangement as the gases enter the upper ends of the passages they will either have to travel in a backward direction as they descend, or they will be diverted or deflected off into the body of the checker, and by properly arranging them it will be found that the great body of the gases will be forced to work sidewise or forwardly from the passages into the body of the checker. Of course the exact form and arrangement and directioning of the passages 14 will be a matter of convenience or of proportions to be applied in any given case.

The passages 14 are conveniently formed by leaving out certain of the checker bricks or blocks, so that these passages in effect become equivalent to the enlarged spacing of the checker blocks in certain portions of the regenerator. It will be seen by leaving out the blocks in this manner the passages 14 will be made several times as large as the usual openings 13 between the blocks or checkers. In order to still further assist in directing the gases and to secure the desired uniform distribution, I have shown shields or baffles 18 mounted over the front portions of the upper ends of each of the passages 14. These will force the gases to work down through the entire surface of the checker as well as down through the passages 14. The result would be that when the checker-work is comparatively new and unobstructed the gas will work down through practically the entire upper surface of the checker, a portion of it working down also through the passages 14 and directly into the body of the checker. However, as the regenerator becomes aged the openings 13 in the upper portion will gradually become more and more obstructed and more and more of the gas will enter the upper ends of the passages 14 and thus find its way directly into the body of the regenerator. Under no circumstances, however, will these passages 14 become obstructed, at least until the later stages of the campaign.

From the foregoing it will be seen that not only will this feature of my invention increase the life of the heat absorbing structure, but that it will also insure a more perfect and more efficient heat absorption and delivery for the reason that the entire mass or body of the checker work will be more uniformly heated at each reversal. It will also be noted in this connection that when the air is being passed backward through the regenerator it will have a direction of travel generally from the opening 16 to the opening 15, and by reason of the diagonal arrangement of the passages 14 the air also will be very uniformly delivered through the entire body of the checker.

In the arrangement shown in Figs. 3 and 4 I have combined or associated the features disclosed in Figs. 1 and 2 with the feature or principle of primary and secondary heat absorbing structures. In the present case the checker work comprises the upper or primary structure 19 and the lower or secondary structure 20. Between these structures there are provided longitudinally extending passage-ways 21 which are formed by the rider walls 22, said walls in turn supporting the primary heat absorbing structure. In the present case the passage-ways 14 extend down through both structures, and particularly through the primary structure to communicate with the longitudinal passage-ways 21. As the hot gases enter at the point 15 they first encounter the primary heat absorbing structure and they are "stunned" by the same, that is to say a portion of their heat is removed so as to chill them a certain amount. Furthermore as the gases strike the primary structure they carry a maximum amount of matter in suspension. The result is that the primary structure will become clogged or closed very much sooner than the secondary structure, but when it does so the gas will readily find its way down through the passages 14 which extend through the primary structure. Even should the upper portion of the secondary structure become clogged or obstructed by flue dust, the lower portions of the passages 14 will serve to effect a distribution of the gases through the body of the secondary structure.

In the arrangement shown in Figs. 5 and 6 I have illustrated the openings or passages through the entire body of the upper portion of the heat absorbing structure as being spaced to provide larger openings throughout its entire body than are provided throughout the body of the lower portion. In the particular arrangement illustrated in these figures I have shown the upper and lower portions of the heat absorbing structure as being separated into distinct primary and secondary heat absorbing structures, although it will be apparent that this distinct separation might be eliminated or dispensed with as far as the feature disclosed in these figures is concerned. In the arrangement illustrated the blocks in the upper portion are spaced to provide the enlarged openings 23 while the blocks in the lower portion are spaced to provide openings 24 of the usual or customary size. In addition I have illustrated the passage-ways 14 through the lower structure so as to permit a more ready and perfect distribution of the gases through the lower structure, should that be necessary. However, the essential feature in this case is that the size of the openings through the different portions of the heat absorbing structure is proportioned according to the probable rate of obstruction by the suspended matter, the larger openings being used where the gases carry the maximum amount of suspended matter and where the temperature is the highest and where the checker-work will ordinarily become closed the most rapidly. This idea is shown in a further modification in Fig. 9 in which the lower ends 25 of the passage-ways 14 are shown as being of smaller size than the upper portions of said passage ways.

In Fig. 10 I have shown still a different form of construction embodying the features of the present invention, the modification in this case consisting in terminating the passages 14 at some point above the lower face of the checker-work. Ordinarily practically the entire body or volume of the flue gases will have entered into the mass of the checker-work before the lower end of the passages 14 are reached. Therefore in such cases it will be desirable to close in the lower ends of the passages with checker-work so as to correspondingly increase the heat storage capacity of the regenerator. At the same time the passages 14 should ordinarily be carried down to such a depth as to insure that the gas will be delivered into all portions of the heat absorbing structure.

I wish to point out by reason of the steps or changes of direction of the passages 14 the gases traveling through said passages will have their direction of travel suddenly changed, which fact will greatly assist in forcing the gases to enter into the body of the checker work or honey-comb, for the reason that the gases will seek the path of least resistance in their travel. In this connection while I have shown the steps as being toward one end of the furnace, it will be evident that they might also be sidewise, this feature having reference to the provision of a passage whose direction frequently changes so as to throw the gases into the body of the checker. I wish also to point out the fact that the passages 14 serve to provide a greatly increased area or surface through which the gases may enter into or penetrate the body of the checker, as compared to a construction in which all of the gases must enter the checker on a single surface, such for example as the top surface of the ordinary checker-work construction. In this connection it will be seen that as the upper courses of the checker-work become closed more and more by the accumulation of flue dust, more and more of the gases will be diverted or by-passed directly into the passages 14, and this change of relationship or distribution of the gases will take place automatically so that the gases will redistribute themselves automatically as the upper courses become clogged or partially closed with the dust. Furthermore this automatic redistribution of the gases is not limited to their distribution with respect to the upper courses of checker-work, but if the sides of any portion of a passage become clogged the gases will pass on down through the passages until they reach a point where they may more readily enter into the body of the checker-work. Furthermore by the use of a construction in which the passages extend clear through or substantially clear through the checker-work, assurance will be had that under no considerations will the regenerator become so clogged as to prevent the easy flow of gas through it, because the passages 14 will always remain open even when the checker-work itself has become clogged, so as to in effect by-pass the checker work or heat absorbing structure. I wish also to point out that openings may be provided for giving convenient access to the different passages or to the tunnels beneath the checker-work, for the purpose of facilitating the removal of accumulated matter therefrom.

Where in the specification and claims I use the terms "honeycomb" and "checker-work" I contemplate not simply the form of construction usually adopted for providing a heat absorbing structure, but also any suitable form of construction which includes an openwork mass of material having connecting openings or passages through which the gases may travel in order to permeate or penetrate substantially the entire mass of material.

I claim:

1. A regenerator structure comprising a honey-comb mass of heat absorbing material having a net work of gas passages extending through its body, said passages being of substantially uniform size, and having a plurality of relatively large gas passages extending through its body from top to bottom thereof, substantially as and for the purpose specified.

2. A regenerator comprising a honey-comb of heat absorbing material, the passages of which are of relatively small cross sectional area, and having a plurality of passages of relatively large cross sectional area extending through the body from top to bottom thereof, substantially as and for the purpose specified.

3. A regenerator comprising a honey-comb of heat absorbing material having its net work of gas passages of relatively small cross sectional area, and having a plurality of other passages of relatively large cross sectional area extending through the mass from top to bottom thereof, substantially as and for the purpose specified.

4. A regenerator comprising a honey-comb of heat absorbing material having its gas passages of relatively small cross-sectional area, and having a plurality of gas passages of relatively large cross-sectional area extending downwardly from the upper portion of the honey-comb into the body portion thereof substantially at right angles to the general direction of gas travel through the regenerator.

5. A regenerator comprising a honey-comb of heat absorbing material having its gas passages of relatively small cross-sectional area, and having a plurality of other passages of relatively large cross-sectional area extending downwardly from the upper portion of the honey-comb toward the lower portion thereof, said passages being stepped from top to bottom, whereby they lie at substantially right angles to the general direction of gas travel through the regenerator.

6. A regenerator comprising a checker-work of heat absorbing material having its gas passages of relatively small cross-sectional area, and having a plurality of other passages of relatively large cross-sectional area extending downwardly from the upper portion of the checkerwork toward the lower portion thereof, said passages being arranged in staggered relationship with respect to each other in any given horizontal plane of section.

7. A regenerator comprising a honey-comb of heat absorbing material having its gas passages of relatively small sectional area, and having a plurality of other passages of relatively large cross-sectional area extending downwardly through its body from the upper portion of the honey-comb toward the lower portion thereof, said passages extending in a direction substantially at right angles to the general direction of gas travel through the regenerator, and said passages being arranged in staggered relationship with respect to each other in any horizontal plane of section.

8. A regenerator comprising a honey-comb of heat absorbing material having its gas passages of relatively small cross-sectional area, and having a plurality of other passages of relatively large cross-sectional area extending downwardly from the upper portion of the honey-comb toward the lower portion thereof, each of said large passages being stepped from top to bottom whereby it lies substantially at right angles to the general direction of gas travel through the regenerator, and said passages being staggered with respect to each other in any given horizontal plane.

9. In a regenerator the combination of primary and secondary heat absorbing structures, each of said structures comprising a honey-comb of heat absorbing material having its gas passages of relatively small cross sectional area, there being other passages of relatively large cross sectional area extending through the body of the regenerator from the upper to the lower portion of the primary heat absorbing structure, substantially as and for the purpose specified.

10. In a regenerator the combination of primary and secondary heat absorbing structures, each of said structures comprising a honey-comb of heat absorbing material, the gas passages of the honey-comb of the secondary heat absorbing structure being of relatively small cross-sectional area, and there being other passages of relatively large cross-sectional area extending from the upper portion toward the lower portion of the heat absorbing structure.

11. In a regenerator the combination of primary and secondary heat absorbing structures, each of said structures comprising a honey-comb of heat absorbing material, and there being gas distribution passages between the primary and secondary structures, there being passages of relatively large cross-sectional area extending downwardly into the body of the secondary heat absorbing structure.

12. In a regenerator the combination of primary and secondary heat absorbing structures, each of said structures comprising a honey-comb of heat absorbing material, the honey-comb of the secondary structure having gas passages of relatively small cross-sectional area, and there being passages of relatively large cross-sectional area extending through the primary structure and into the body of the secondary structure.

13. In a regenerator the combination of primary and secondary heat absorbing structures, each of said structures comprising a honey-comb of heat absorbing material, the honey-comb of the secondary structure having gas passages of relatively small cross-sectional area, and there being gas passages of relatively large cross-sectional area extending through the primary structure and into the body of the secondary structure, each of said relatively large passages extending in a direction substantially at right angles to the general direction of gas travel through the regenerator.

14. In a regenerator the combination of primary and secondary heat absorbing structures, each of said structures comprising a honey-comb of heat absorbing material, the secondary structure having gas passages of relatively small cross sectional area, there being other passages of relatively large cross-sectional area extending through the primary structure and into the body of the secondary structure, the relatively large passages in the secondary structure being stepped and lying in a direction substantially at right angles to the general direction of gas travel through the regenerator.

15. A regenerator comprising a honey-comb of heat absorbing material having its gas passages of relatively small cross-sectional area and having a plurality of other passages of relatively large cross-sectional area extending downwardly from the upper portion of the honeycomb toward the lower portion thereof, said relatively large passages being provided with steps from top to bottom whereby gases flowing down through said passages are forced to change direction at each of said steps.

16. A regenerator comprising a honey-comb of heat absorbing material having its gas passages of relatively small cross-sectional area and having a plurality of relatively large passages extending downwardly from the upper portion of the honeycomb toward the lower portion thereof, said relatively large passages lying at an acute angle to the general direction of gas movement, whereby the gases flowing into said passages tend to flow sidewise from the passages into the body of the heat absorbing material.

17. A regenerator comprising a honey-comb of heat absorbing material having its gas passages of relatively small cross-sectional area and having a plurality of other passages of relatively large cross-sectional area extending downwardly from the upper portion of the honeycomb toward the lower portion thereof, and a baffle or deflector adjacent the upper end of each of said relatively large passages.

18. A regenerator comprising a honey-comb of heat absorbing material having its gas passages of relatively small cross-sectional area and having a plurality of other passages of relatively large cross-sectional area extending downwardly from the upper portion of the honeycomb toward the lower portion thereof, and a baffle mounted adjacent the forward side of the upper end of each of said relatively large passages to thereby cause gases coming into the regenerator to suddenly change direction as they enter the relatively large passages.

19. A regenerator comprising a network of heat absorbing material having its gas passages regularly formed and located, and having the gas passages of its lower portion of relatively small cross sectional area and those of its upper portion of relatively large cross sectional area, whereby the passages in the upper portion of the network may become partially closed by the cindering of flue dust without interfering with the free flow of gases through the said portion of the structure to that portion of the structure wherein the passages are of relatively small cross sectional area.

20. A regenerator comprising a network of heat absorbing material having its gas passages regularly formed and located, and having the gas passages in its lower courses of relatively small cross sectional area as compared to those in its upper courses, whereby cindering of gases into the structure of the upper portion of the network will not prevent the free flow of gases therethrough to the lower portion of the structure.

21. A regenerator comprising a honeycomb of heat absorbing material having the gas passages throughout its entire body regularly formed and located, and having the passages throughout substantially the entire area of its upper courses of relatively large cross sectional size as compared to the gas passages throughout substantially the entire area of its lower courses, substantially as and for the purpose set forth.

22. A regenerator comprising a network of heat absorbing material having its gas passages regularly formed and placed, and having those passages on its incoming side of relatively large cross sectional area, and those passages on its outgoing side of relatively small cross sectional area, whereby the hot gases first encounter that portion of the structure in which the gas passages are of relatively large cross sectional area, the heat absorbing material having the passages of relatively large cross sectional area being mounted at a greater elevation than the heat absorbing material having the passages of relatively small cross sectional area, substantially as and for the purpose set forth.

23. A regenerator comprising a network of heat absorbing material having its gas passages regularly formed and placed, and having the gas passages throughout substantially the entire area of the courses on the incoming side of relatively large cross sectional area as compared to those throughout substantially the entire area of the courses on the outgoing side, the heat absorbing material having its gas passages of relatively large cross sectional area being at a greater elevation than the heat absorbing material having its gas passages of relatively small cross sectional area, substantially as and for the purpose set forth.

FRANK ORTH.

Witnesses:
Thomas A. Banning, Jr.,
Wm. P. Bond.